UNITED STATES PATENT OFFICE.

HARRY PAULING, OF GELSENKIRCHEN, GERMANY, ASSIGNOR TO THE FIRM OF SALPETERSÄURE-INDUSTRIE-GESELLSCHAFT, G. M. B. H., OF GELSENKIRCHEN, GERMANY.

PROCESS FOR THE PRODUCTION OF PURE NITRIC ACID.

No. 877,447.   Specification of Letters Patent.   Patented Jan. 21, 1908.

Application filed April 6, 1906. Serial No. 310,299.

*To all whom it may concern:*

Be it known that I, HARRY PAULING, a subject of the German Emperor, and resident of 84 Wilhelmstrasse, in Gelsenkirchen, in the Province of Westphalia, in the Kingdom of Prussia, German Empire, have invented certain new and useful Improvements in Processes for the Production of Pure Nitric Acid, of which the following is a specification.

This invention relates to processes for the production of pure nitric acid.

According to my invention such nitric acid is produced from nitrogenous gases, such as are obtained, for example, by subjecting atmospheric air to the action of electrical discharges.

To such end the invention consists in adding water or aqueous vapor to the hot nitrogenous gases, so as to intimately mix them therewith while the nitrogenous gases have a minimum temperature of 200° C., and in cooling down the mixture until pure nitric acid is formed.

A further improvement consists in so proportioning the quantity of water or aqueous vapor to be added that the vapors of nitric acid produced thereby have a temperature at which they are still in a gaseous condition, that is, a temperature of about 100° C.

The object in this case is, to be able to pass the nitric acid while in its gaseous condition into metallic pipes where it is cooled down to a certain temperature. It is then conducted into suitable clay apparatus for condensation. In these metallic cooling apparatus the gases of nitric acid are so far cooled down that the clay apparatus shall not be affected by an undue temperature of the gases received for condensation. Also the hot gases of reaction, that is the nitrogenous gases resulting from the action of the electrical discharges on the air, may be received in metallic pipes and here be mixed with the requisite quantity of water or aqueous vapor.

It is advantageous, in connection with this process, to use such air as contains no more than ½ per cent. of its volume as nitric oxid.

What is claimed is:

1. The hereindescribed process, consisting in subjecting atmospheric air to the action of electrical discharges, mixing the nitrogenous gases, thus formed, with water or aqueous vapor while the said gases have a minimum temperature of 200° C., and cooling down the mixture, as set forth.

2. The hereindescribed process, consisting in subjecting atmospheric air to the action of electrical discharges, mixing the nitrogenous gases, thus formed, with water or aqueous vapor while the said gases have a minimum temperature of 200° C., the quantity of water or aqueous vapor being so proportioned that the nitric acid formed remains in its gaseous condition; and in passing the gases of nitric acid into suitable metallic cooling apparatus and from thence into suitable clay apparatus for condensation, as set forth.

In witness whereof I have hereunto signed my name this 23rd day of February 1906, in the presence of two subscribing witnesses.

HARRY PAULING.

Witnesses:
ULYSSES J. BYWATER,
GEORG KENNER.